United States Patent
Ashizawa (12) 
(10) Patent No.: US 7,938,098 B2
(45) Date of Patent: May 10, 2011

(54) CONTROL APPARATUS AND CONTROL METHOD OF IN-CYLINDER INJECTION TYPE SPARK IGNITION INTERNAL COMBUSTION ENGINE

(75) Inventor: Takeshi Ashizawa, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 210 days.

(21) Appl. No.: 12/303,302

(22) PCT Filed: Jul. 26, 2007

(86) PCT No.: PCT/IB2007/002128
§ 371 (c)(1),
(2), (4) Date: Dec. 3, 2008

(87) PCT Pub. No.: WO2008/012656
PCT Pub. Date: Jan. 31, 2008

(65) Prior Publication Data
US 2009/0194069 A1 Aug. 6, 2009

(30) Foreign Application Priority Data

Jul. 27, 2006 (JP) ................................ 2006-204611
Jul. 27, 2006 (JP) ................................ 2006-204612

(51) Int. Cl.
*F02B 3/00* (2006.01)
(52) U.S. Cl. ......................... 123/294; 123/305; 701/105
(58) Field of Classification Search .................. 123/294, 123/299, 305; 701/103–105
See application file for complete search history.

(56) References Cited

U.S. PATENT DOCUMENTS

| 5,775,288 A | 7/1998 | Suzuki et al. |
| 5,832,901 A * | 11/1998 | Yoshida et al. ............... 123/478 |
| 7,194,999 B2 * | 3/2007 | Kono et al. .............. 123/406.47 |
| 2002/0134346 A1 | 9/2002 | Yamauchi et al. |
| 2003/0074890 A1 | 4/2003 | Yamashita et al. |
| 2009/0071440 A1* | 3/2009 | Ashizawa ................ 123/406.29 |
| 2010/0012081 A1* | 1/2010 | Ashizawa ..................... 123/301 |

FOREIGN PATENT DOCUMENTS

| EP | 1 243 777 | 9/2002 |
| EP | 1 291 512 | 3/2003 |
| JP | 9 126028 | 5/1997 |
| JP | 10 159619 | 6/1998 |
| JP | 11 218047 | 8/1999 |
| JP | 11 303661 | 11/1999 |
| JP | 2000 230444 | 8/2000 |
| JP | 2002 161790 | 6/2002 |
| JP | 2003 97317 | 4/2003 |
| JP | 2003 322022 | 11/2003 |
| JP | 2005 180247 | 7/2005 |

* cited by examiner

*Primary Examiner* — John T Kwon
(74) *Attorney, Agent, or Firm* — Oblon, Spivak, McClelland, Maier & Neustadt, L.L.P.

(57) ABSTRACT

An ECU controls an internal combustion engine which generates a tumble flow inside a cylinder and strengthens the tumble flow by fuel injected near bottom dead center of an intake stroke. The ECU includes an injection timing changing device that changes the injection timing of fuel based on the amount of air drawn into a cylinder of the internal combustion engine.

8 Claims, 8 Drawing Sheets

CONTROL APPARATUS AND CONTROL METHOD OF IN-CYLINDER INJECTION TYPE SPARK IGNITION INTERNAL COMBUSTION ENGINE

BACKGROUND OF THE INVENTION

1. Field of the Invention

The invention relates to a control apparatus and control method of an in-cylinder injection type spark ignition internal combustion engine.

2. Description of the Related Art

By creating a tumble flow inside a cylinder of an in-cylinder injection type spark ignition internal combustion engine and then adequately strengthening that tumble flow with fuel injected near bottom dead center (BDC) on the intake stroke during homogeneous combustion, the tumble flow can be maintained until the ignition timing. This improves the combustion rate of the air-fuel mixture, thus enabling good homogeneous combustion to be achieved. As technology relating to this kind of fuel injection, Japanese Patent Application Publication No. JP-A-2003-322022, for example, proposes a fuel injection control apparatus that strengthens the circulatory airflow within the cylinder using fuel injected from a fuel injection valve. Also, as technology which strengthens the intake airflow within the cylinder during homogeneous combustion, Japanese Patent Application Publication No. JP-A-2005-180247, for example, proposes an intake control apparatus for an in-cylinder direct injection type internal combustion engine that strengthens the intake airflow by controlling an intake airflow control valve provided in an intake passage. Also, Japanese Patent Application Publication No. JP-A-10-159619 proposes technology that improves the homogeneity of the air-fuel mixture by performing a split injection in which some of the fuel is injected during the first half of the intake stroke and the rest of the fuel is injected during the last half of the intake stroke.

However, in the in-cylinder injection type spark ignition internal combustion engine described above, when the air-fuel ratio is lean, the amount of air in the cylinder is greater than it is with the stoichiometric air-fuel ratio so the mass of the tumble flow increases. As a result, even if fuel is injected as described above, the tumble flow is no longer able to be sufficiently strengthened. In this case, the attenuation of the tumble flow makes it no longer possible to ensure that the tumble flow will be sufficiently strong at the ignition timing. Therefore, the swirl of the air-fuel mixture is no longer able to be maintained until the ignition timing. Furthermore, if the swirl of the air-fuel mixture is unable to be sufficiently maintained until the ignition timing, the combustion rate will become too slow which has adverse affects, such as it increases the tendency for knocking to occur, and thus makes good combustion unable to be achieved.

Also, when improving output by the latent heat of vaporization effect in the high load operating range in the foregoing in-cylinder injection type spark ignition internal combustion engine, the injection timing is changed so that it becomes farther from near BDC of the intake stroke and closer to top dead center (TDC) of the intake stroke as the engine speed increases because it is important to inject the fuel during a period when the most air enters the cylinder. On the other hand, in this case the piston position during fuel injection is also approaching TDC so the space within the cylinder during the fuel injection becomes narrower. However, when that space is narrow, the tumble flow does not swirl well so in this state it is difficult to strengthen the tumble flow even if fuel is injected. That is, in this case, although the latent heat of vaporization effect can be obtained, there still remains room for improvement with respect to the homogeneity of the air-fuel mixture and the combustion rate.

SUMMARY OF THE INVENTION

This invention thus provides a control apparatus and control method of an in-cylinder injection type spark ignition internal combustion engine that achieves good combustion by changing a fuel injection timing based on the operating state of the internal combustion engine to strengthen a tumble flow by the injected fuel.

A first aspect of the invention relates to a control apparatus of an in-cylinder injection type spark ignition internal combustion engine that generates a tumble flow inside a cylinder and strengthens the tumble flow by fuel injected near bottom dead center of an intake stroke. This control apparatus is characterised by including injection timing changing means for changing an injection timing of the fuel based on an amount of air drawn into the cylinder.

In the first aspect, the injection timing changing means may retard the injection timing of the fuel more the leaner a required air-fuel ratio becomes. According to this structure, the period between the fuel injection timing and the ignition timing can be shortened so the ignition timing comes before the tumble flow, which has been strengthened by the injected fuel, attenuates much. As a result, the swirl of the air-fuel mixture can be maintained until the ignition timing, thus making it possible for good combustion to be achieved.

Further, the foregoing stricture may also include split injecting means for injecting the fuel in parts when the degree of leanness of the required air-fuel ratio exceeds a predetermined value. Here, when the fuel injection timing is retarded, the period between the fuel injection timing and the ignition timing becomes shorter. As a result, the homogeneity of the air-fuel mixture tends to gradually become worse. If fuel is injected at a timing that is retarded to a degree suitable for the required degree of leanness that exceeds the predetermined value, the period between the fuel injection timing and the ignition timing becomes substantially shorter. As a result, the homogeneity of the air-fuel mixture ends up deteriorating with a large decline in the energy efficiently. In contrast, according to the foregoing structure, the fuel is injected in parts so air is sandwiched between the injected fuel. This not only promotes vaporization of the fuel, but also improves the homogeneity, thereby enabling good combustion to be achieved.

In the foregoing first aspect, when the in-cylinder injection type spark ignition internal combustion engine is operating in a high load operating range and the engine speed of the in-cylinder injection type spark ignition internal combustion engine is higher than a predetermined speed, the injection timing changing means may perform a first fuel injection during a period when the most air enters the cylinder and perform a second fuel injection near bottom dead center of the intake stroke. According to this structure, an improvement in output from the latent heat of vaporization effect can be promoted by the first fuel injection and the tumble flow can be strengthened by the second fuel injection, thereby enabling both homogeneity of the air-fuel mixture and the combustion rate to be improved.

In the foregoing structure, the injection timing changing means may advance the first fuel injection more the higher the engine speed becomes. Here, the period when the most air enters the cylinder differs depending on the speed of the internal combustion engine even in a high load operating range. Therefore, by advancing the first fuel injection as in the foregoing structure, the first fuel injection can be performed during a period when the most air enters the cylinder.

The foregoing structure may also include injection quantity controlling means for controlling an injection quantity of the fuel so that a crank angle range that corresponds to the fuel injection period of the second fuel injection becomes substantially constant with respect to a change in an operating state of the in-cylinder injection type spark ignition internal combustion engine. Here, while a certain quantity of fuel is required to maintain the tumble flow until the ignition timing to improve the combustion rate, the tumble flow does not need to be strengthened that much to improve the homogeneity of the air-fuel mixture. Therefore, as long as the minimum amount of fuel necessary is injected, a sufficient effect can be obtained. According to the foregoing structure, the homogeneity of the air-fuel mixture in particular is improved by the second fuel injection. Moreover, by making the amount of fuel in the second fuel injection the minimum amount necessary, a sufficient latent heat of vaporization effect can be obtained by the first fuel injection.

A second aspect of the invention relates to a control method of an in-cylinder injection type spark ignition internal combustion engine that generates a tumble flow inside a cylinder and strengthens the tumble flow by fuel injected near bottom dead center of an intake stroke. This control method is characterised by including changing an injection timing of the fuel based on an amount of air drawn into the cylinder of the in-cylinder injection type spark ignition internal combustion engine.

This invention thus provides a control apparatus and control method of an in-cylinder injection type spark ignition internal combustion engine that can achieve good combustion by changing a fuel injection timing based on the operating state of an amount of air drawn into the cylinder to strengthen a tumble flow by the injected fuel.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

In the following description and the accompanying drawings, the present invention will be described in more detail in terms of example embodiments.

First Example Embodiment

Figure 1:
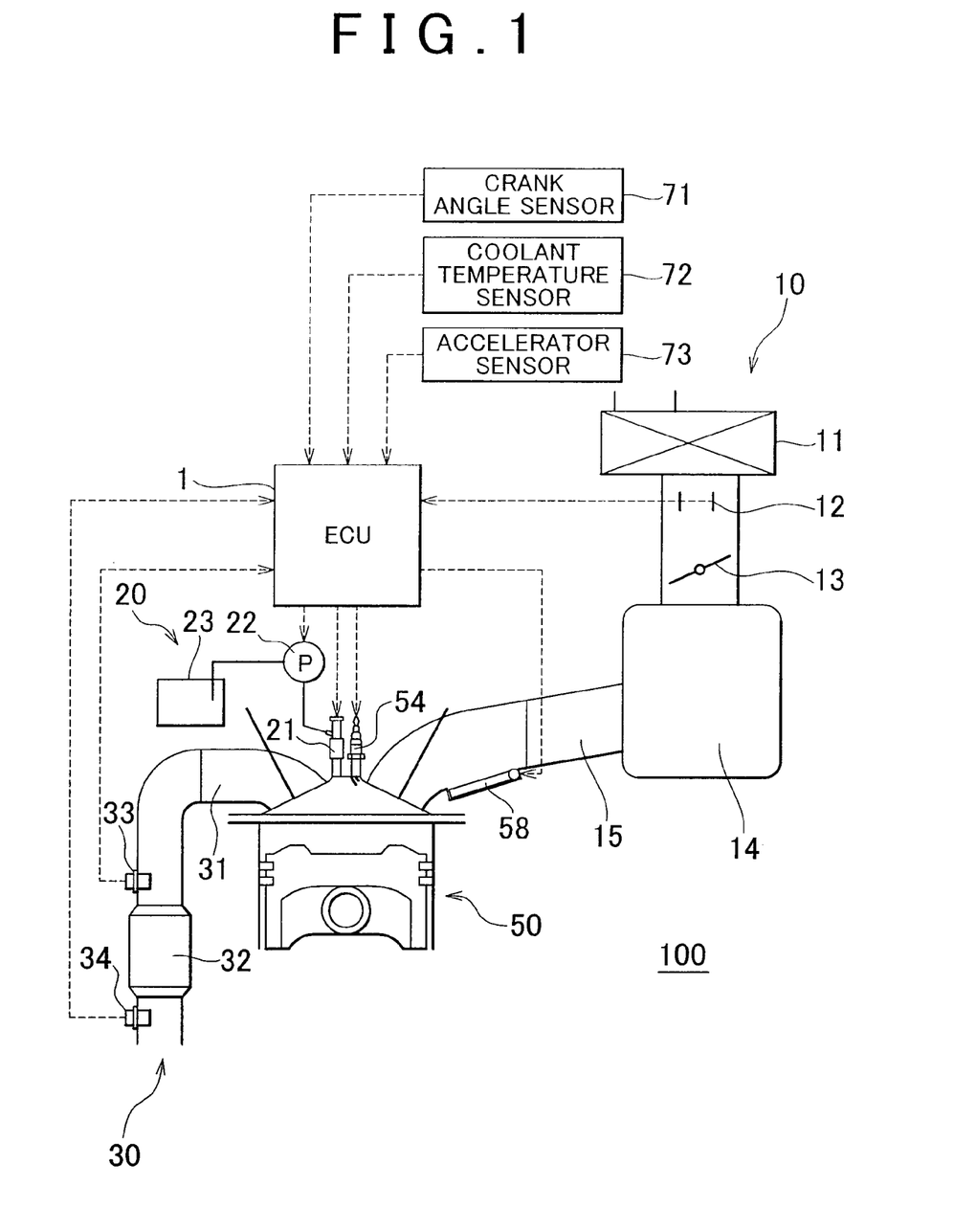
FIG. 1 is a view showing both an ECU and a frame format of an internal combustion engine system according to a first example embodiment of the invention.

FIG. 1 is a view showing a frame format of a control apparatus of an in-cylinder injection type spark ignition internal combustion engine, which is realized by an ECU (Electronic Control Unit) 1, according to a first example embodiment of the invention, as well as an internal combustion engine system 100. The internal combustion engine system 100 includes an intake system 10, a fuel injection system 20, an exhaust system 30, and an internal combustion engine 50. The intake system 10 introduces air into the internal combustion engine 50, and includes, for example, an air cleaner 11 for filtering the intake air, an airflow meter 12 that measures the air amount, a throttle valve 13 that adjusts the flowrate of the intake air, a surge tank 14 for temporarily storing the intake air, an intake manifold 15 that distributes the intake air among the cylinders of the internal combustion engine 50, and an intake pipe appropriately arranged between these components.

The fuel injection system 20 supplies and injects fuel and includes a fuel injection valve 21, a fuel injection pump 22, and a fuel tank 23, and the like. The fuel injection valve 21 injects fuel by opening at an appropriate injection timing under the control of the ECU 1. Also, the fuel injection quantity is adjusted under the control of the ECU 1 by the duration for which the fuel injection valve 21 remains open until it closes. The fuel injection pump 22 generates injection pressure by pressurizing the fuel and adjusts the injection pressure appropriately under the control of the ECU 1.

The exhaust system 30 includes, for example, an exhaust manifold 31, a three-way catalyst 32, a muffler, not shown, and an exhaust pipe appropriately arranged between these components. The exhaust manifold 31 merges the exhaust gas from all of the cylinders by bringing the exhaust passages that branch off to each cylinder together into one exhaust passage on the downstream side. The three-way catalyst 32 purifies exhaust gas by oxidizing hydrocarbons HC and carbon monoxide CO, and reducing oxides of nitrogen ($NO_x$). In the exhaust system 30, an A/F sensor 33 for linearly detecting the air-fuel ratio based on the oxygen concentration in the exhaust gas is arranged upstream of the three-way catalyst 32, and an oxygen sensor 34 for detecting whether the air-fuel ratio is richer or leaner than the stoichiometric air-fuel ratio based on the oxygen concentration in the exhaust gas is arranged downstream of the three-way catalyst 32.

Figure 2:
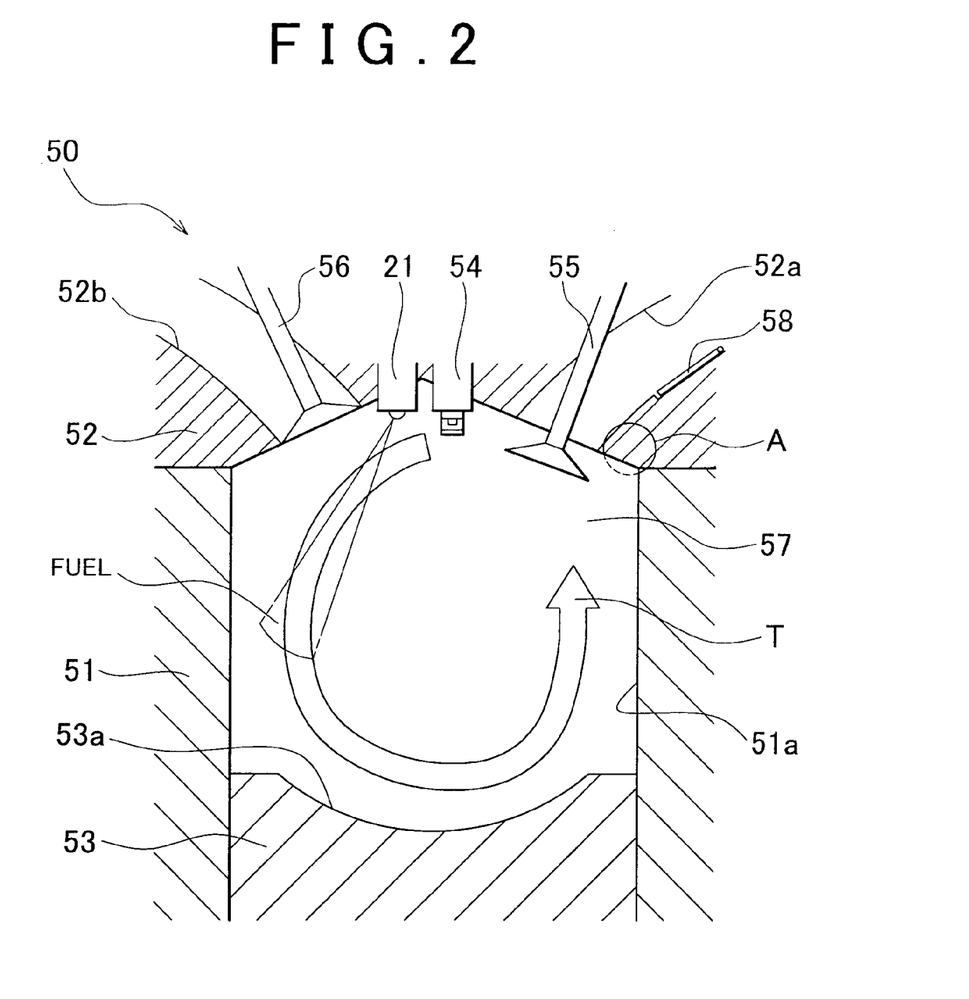
FIG. 2 is a view showing a frame format of the main portions of the internal combustion engine.

FIG. 2 is a view showing a frame format of the main portions of the internal combustion engine 50. The internal combustion engine 50 includes a cylinder block 51, a cylinder head 52, a piston 53, a spark plug 54, an intake valve 55, and an exhaust valve 56. The internal combustion engine 50 in this example embodiment is an in-line four cylinder in-cylinder injection type spark ignition internal combustion engine. However, the configuration and number of cylinders in the internal combustion engine of the invention is not limited to those of the internal combustion engine in this example embodiment. Also, FIG. 2 shows the main portions of a cylinder 51a of the internal combustion engine 50 that is representative of each cylinder. In this example embodiment, the other cylinders all have the same structure as the cylinder 51a. The cylinder 51a is formed generally cylindrical in the cylinder block 51, and the piston 53 is housed in the cylinder 51a. A cavity 53a for guiding the tumble flow T is formed in the top of the piston 53. The cylinder head 52 is fixed to the upper surface of the cylinder block 51. A combustion chamber 57 is formed as a space that is surrounded by the cylinder block 51, the cylinder head 52, and the piston 53. Both an intake port 52a for guiding intake air into the combustion chamber 57 and an exhaust port 52b for discharging combusted gas from the combustion chamber 57 are formed in the cylinder head 52. Moreover, intake and exhaust valves 55 and 56 for opening and closing the intake and exhaust ports 52a and 52b, respectively, are also arranged in the cylinder head 52. The internal combustion engine 50 may be provided with an appropriate number of intake and exhaust valves 55 and 56 in each cylinder.

The spark plug 54 is arranged in the cylinder head 52 so that the electrode protrudes out in substantially the center above the combustion chamber 57. The fuel injection valve 21 is also arranged in the cylinder head 52 so that a nozzle of the fuel injection valve 21 protrudes out into the combustion chamber 57 from a position adjacent to the spark plug 54 above the combustion chamber 57. The arrangement of the fuel injection valve 21 is not limited to this, however. For example, the fuel injection valve 21 may be arranged in the cylinder head 52 so that the nozzle of the fuel injection valve 21 protrudes out into the combustion chamber 57 from the intake port 52a side (i.e., portion A in FIG. 2), above the combustion chamber 57. Also, a plurality of the fuel injection valves 21 may be provided for each cylinder.

An airflow control valve 58 for generating the tumble flow T inside the combustion chamber 57 is arranged in the intake port 52a. The airflow control valve 58 generates the tumble flow T inside the combustion chamber 57 by changing the flow of the intake air inside the intake port 52a under the control of the ECU 1. However, tumble flow generating means for generating the tumble flow T inside the combustion chamber 57 is not limited to the airflow control valve 58. For example, the shape of the intake port 52a may be made to generate the tumble flow T in the cylinder, or other appropriate means capable of generating the tumble flow T in the cylinder may be used. The tumble flow T is a directed tumble flow that whirls around inside the cylinder in such a way that is rises on the intake valve 55 side in the combustion chamber 57. In this example embodiment, the fuel injection valve 21 injects fuel near BDC of the intake stroke under the control of the ECU 1 during homogeneous combustion. The injected fuel adequately strengthens the tumble flow T and this strengthened tumble flow T is maintained until the ignition timing. As a result, the combustion rate is adequately increased, thereby enabling good homogeneous combustion to be achieved.

Incidentally, because a sufficiently strong tumble flow T is difficult to obtain by partly or fully opening the airflow control valve 58 during homogeneous combustion in order to increase the amount of intake air, and also by the shape of the intake port 52a alone, for example, in general there still remains room for improvement with respect to flame propagation and the mixing ability of the air-fuel mixture during homogeneous combustion using only these means. In addition, the internal combustion engine 50 is provided with various sensors such as a crank angle sensor 71 that produces an output pulse corresponding to the engine speed Ne, and a coolant temperature sensor 72 for detecting the coolant temperature in the internal combustion engine 50.

The ECU 1 includes a CPU (Central Processing Unit), ROM (Read Only Memory), RAM (Random Access Memory), and an input/output circuit, and the like, none of which are shown. The ECU 1 is mainly designed to control the internal combustion engine 50. In this example embodiment, the ECU 1 controls not only the fuel injection valve 21 and the fuel injection pump 22, but also the spark plug 54 (or more specifically, an igniter, not shown), and the airflow control valve 58 (or more specifically, an actuator, not shown, for the airflow control valve 58), and the like. The ECU 1 is therefore connected via a drive circuit, not shown, to the fuel injection valve 21 and the other components that it controls. The ECU 1 is also connected to various sensors such as the airflow meter 12, the A/F sensor 33, the oxygen sensor 34, the crank angle sensor 71, the coolant temperature sensor 72, and an accelerator sensor 73 that detects the depression amount (accelerator opening amount) of an accelerator pedal, not shown.

The ROM stores programs in which are written various steps that are executed by the CPU. In this example embodiment, the ROM stores not only an internal combustion engine control program for controlling the internal combustion engine 50, but also other programs such as a fuel injection valve control program for controlling the fuel injection valve 21. Incidentally, the fuel injection valve control program may be part of the internal combustion engine control program. The fuel injection valve control program includes an injection quantity control program for controlling the fuel injection quantity, an injection pressure control program for controlling the fuel injection pressure, and an injection timing control program for controlling the fuel injection timing. In this example embodiment, the injection timing control program is such that it specifically includes a control program to specify the injection timing (hereinafter referred to as "injection timing specifying control program") for retarding the fuel ignition timing more the leaner the required air-fuel ratio becomes.

Figure 3:
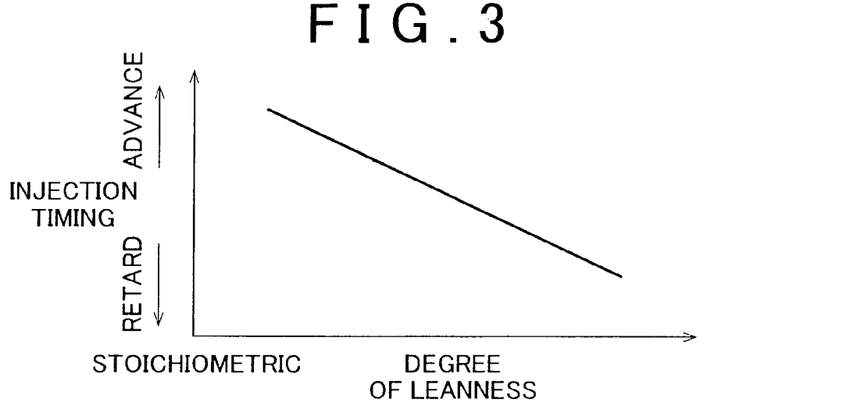
FIG. 3 is a is a view showing a frame format of an injection timing map.

More specifically, in this example embodiment, the injection timing specifying control program is created to read the injection timing that corresponds to the degree of leanness of the required air-fuel ratio referencing a map that shows the relationship between the degree of leanness of the required air-fuel ratio and the injection timing (hereinafter this map will simply be referred to as the "injection timing map"), and change the injection timing to the injection timing read from the injection timing map. FIG. 3 is a view showing a frame format of a injection timing map that shows the relationship between the degree of leanness of the required air-fuel ratio and the injection timing. In this example embodiment, this injection timing map is also stored in the ROM. When the air-fuel ratio is the stoichiometric air-fuel ratio, the injection timing map shows the injection timing to be the normal injection timing. Good homogeneous combustion can be achieved with this ignition timing based on the tumble flow T that was adequately strengthened by the fuel injected near BDC of the intake stroke during homogeneous combustion.

In contrast, when the air-fuel ratio becomes lean, the amount of air in the cylinder increases so the mass of the tumble flow T increases. As a result, the tumble flow T is unable to be sufficiently strengthened when fuel is injected at the same injection timing as it is with the stoichiometric air-fuel ratio. In this case, attenuation of the tumble flow T prevents sufficient strength of the tumble flow T at the ignition timing from being ensured so the swirl of the air-fuel mixture at the ignition timing decreases. As a result, the combustion rate is no longer able to be sufficiently improved so good combustion can no longer be achieved. Therefore, the injection timing map in this example embodiment is set such that the injection timing is retarded more the leaner the required air-fuel ratio becomes. Accordingly, the period between the injection timing and the ignition timing becomes shorter the leaner the required air-fuel ratio becomes. As a result, the tumble flow T can be suppressed from attenuating much by the ignition timing. Incidentally, the relationship between the degree of leanness of the required air-fuel ratio and the injection timing on the injection map does not always have to be a linear one. In this example embodiment, various detecting means, determining means, and controlling means and the like are realized by the CPU, the ROM, and the RAM (hereinafter simply referred to collectively as the "CPU and the like") together with the internal combustion engine control program. In particular, injection timing changing means is realized by the CPU and the like together with the injection timing specifying control program.

Figure 4:
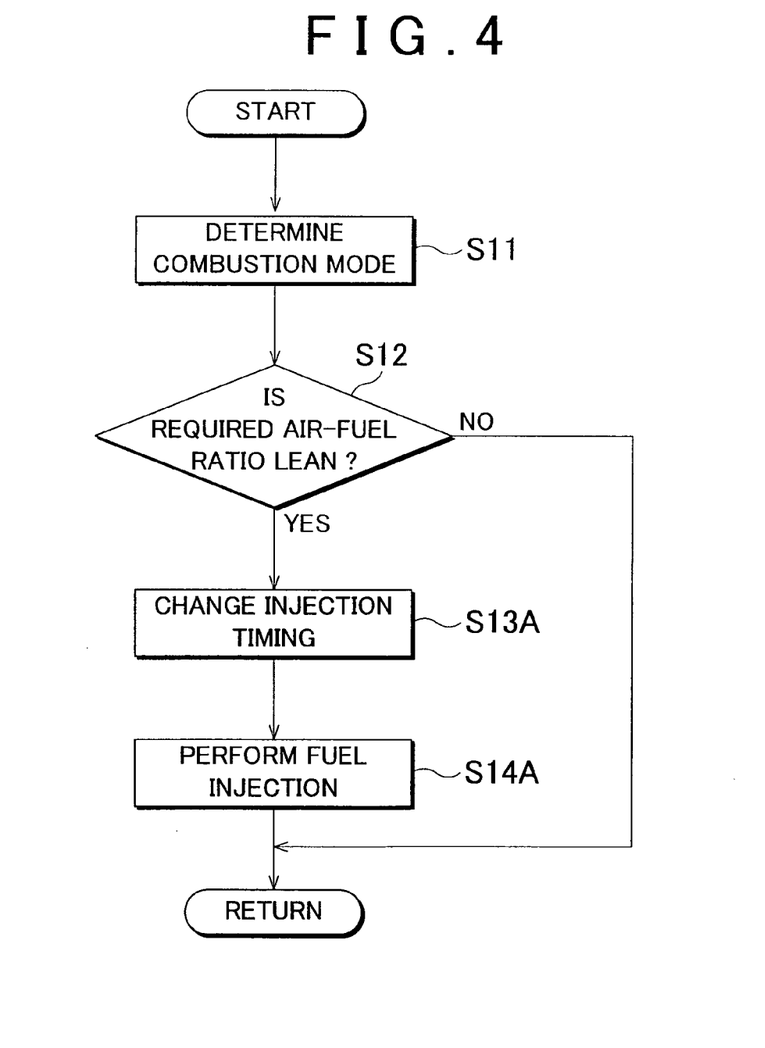
FIG. 4 is a flowchart of a routine that is executed by the ECU according to the first example embodiment of the invention.

Next, a routine executed by the ECU 1 to change the ignition timing in response to the degree of leanness of the required air-fuel ratio will be described in detail using the flowchart shown in FIG. 4. The ECU 1 controls the internal combustion engine 50 by having the CPU repeatedly execute the steps shown in the flowchart based on various programs such as the fuel injection valve control program and the internal combustion engine control program described above, which are stored in the ROM. The CPU first determines the mode of combustion performed in the internal combustion engine 50 (step S11). In this example embodiment, the CPU determines the mode of combustion performed in the internal combustion engine 50 based on the engine speed Ne which is detected based on an output signal from the crank angle sensor 71, a load factor KL which is detected based on an output signal from the accelerator sensor 73, and a combustion mode map which is defined by the engine speed Ne and the load factor KL.

Figures 5, 6A:
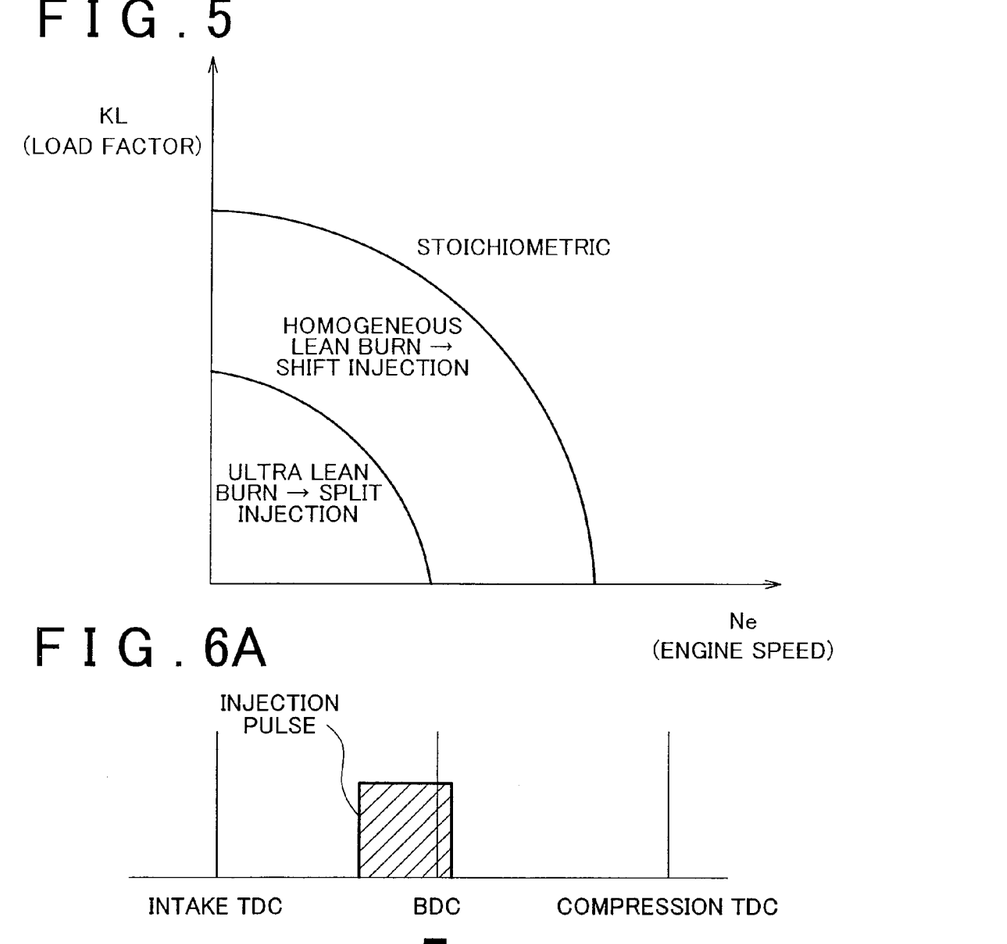
FIG. 5 is a view showing a frame format of a combustion mode map.
FIGS. 6A and 6B are views showing a frame format of fuel injections before and after the injection timing is changed.

FIG. 5 is a view showing a frame format of a combustion mode map. On the map in this example embodiment, the combustion mode is divided into three regions, i.e., stoichiometric, homogeneous lean burn, and ultra lean burn, according to the engine speed Ne and the load factor KL. However, the invention is not limited to this. For example, the combustion mode may be divided into an appropriate number of regions, e.g., it may be broken down into more regions. Furthermore, in this example embodiment, the degree of leanness of the required air-fuel ratio is set broadly according to these regions. During stoichiometric, the degree of leanness of the required air-fuel ratio is "zero". During homogeneous lean burn, the degree of leanness of the required air-fuel ratio is "medium", and during ultra lean burn, the degree of leanness of the required air-fuel ratio is "high". However, the invention is not limited to this. For example, the degree of leanness of the required air-fuel ratio may be set appropriately according to the engine speed Ne and the load factor KL. Incidentally, the combustion mode and the degree of leanness of the required air-fuel ratio are not limited to being set according to the engine speed Ne and the load factor KL. They may also be set according to a suitable operating state of the internal combustion engine 50.

Figure 6B:
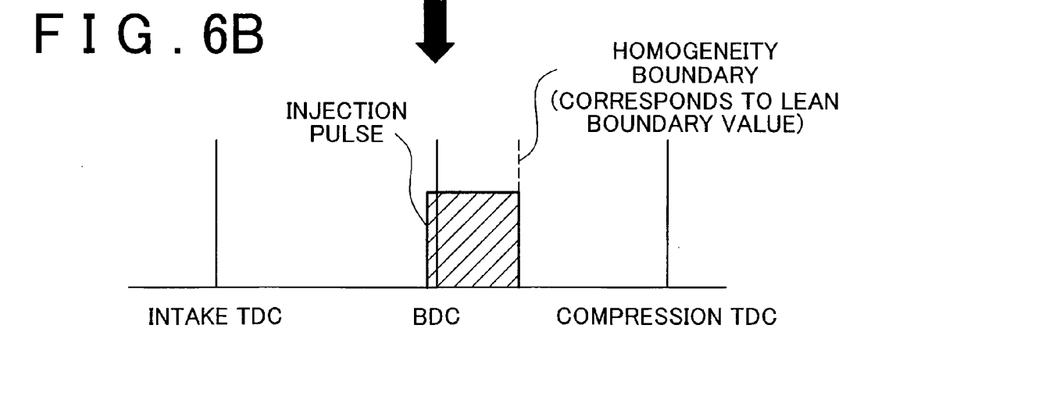

After step S11, the CPU determines whether the required air-fuel ratio that corresponds to the engine speed Ne and the load factor KL detected from the combustion mode map is lean (step S12). If the determination is no, the process returns to step S11 without any particular steps being taken. On the other hand, if the determination is yes, the CPU reads the degree of leanness of the required air-fuel ratio from the combustion mode map, reads the injection timing that corresponds to this degree of leanness referencing the injection timing map, and changes the injection timing to the injection timing read from the injection timing map (step S13A). As a result, the injection timing is retarded more the leaner the required air-fuel ratio becomes. FIGS. 6A and 6B are views showing a frame format of fuel injections before and after the injection timing is changed. In this step, the injection timing is changed, i.e., retarded, so that the fuel that was injected on the intake stroke side near BDC of the intake stroke as shown in FIG. 6A is injected on the compression stroke side near BDC of the intake stroke, as shown in FIG. 6B.

Next, the CPU controls the fuel injection valve 21 to inject fuel at the injection timing read in step S13A (step S14A). Therefore the period of time from the injection timing to the ignition timing is shorter, making it possible to ensure that the tumble flow T is sufficiently strong at the ignition timing. As a result, the swirl of the air-fuel mixture can be sufficiently maintained until the ignition timing. Thus, the combustion rate can be adequately improved, thereby enabling good combustion to be achieved. Accordingly, it is possible to realize an ECU 1 that can achieve good combustion by changing the fuel injection according to the degree of leanness of the required air-fuel ratio to strengthen the tumble flow T with the injected fuel.

Second Example Embodiment

The ECU 1 according to the first example embodiment of the invention is the same as the ECU 1 according to the second example embodiment of the invention except for that the fuel injection valve control program has a split injection program that will be described below. Also, the structure of the internal combustion engine system to which the ECU 1 of the second example embodiment is applied is the same as that shown in FIG. 1. The split injection program is created so that the fuel injection becomes a split injection, i.e., the fuel is injected in parts, when the degree of leanness of the required air-fuel ratio exceeds a predetermined lean boundary value. More specifically, in this example embodiment, the degree of leanness of the required air-fuel ratio exceeds the predetermined lean boundary value when the combustion mode shown in FIG. 5 changes from homogeneous lean burn to ultra lean burn. In this example embodiment, split injection means is realized by the CPU and the like and the split injection program, and the control apparatus of the in-cylinder injection type spark ignition internal combustion engine is realized by the ECU 1.

Figure 7:
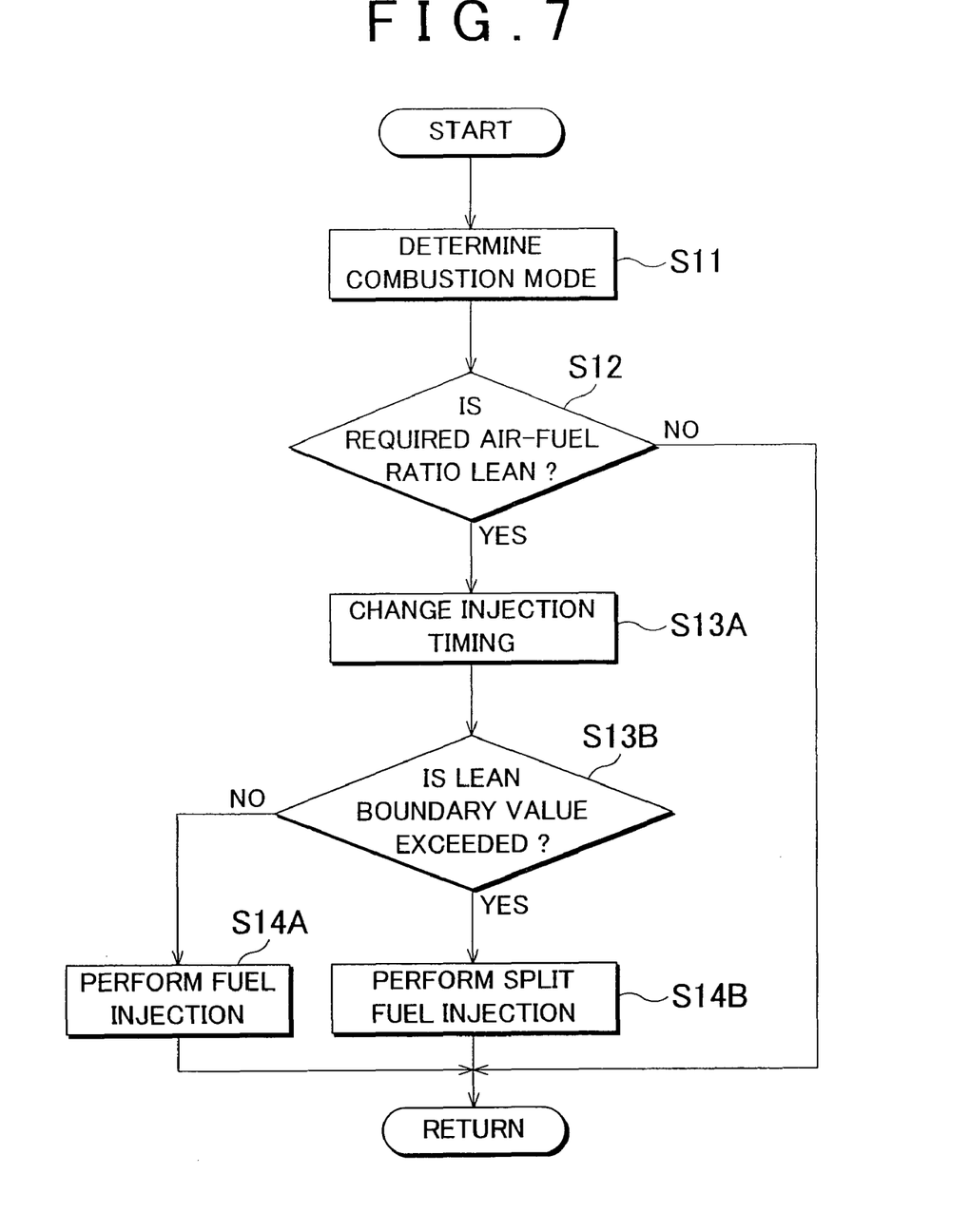
FIG. 7 is a flowchart of a routine that is executed by an ECU according to a second example embodiment of the invention.

Next, the routine executed by the ECU 1 to perform a split injection according to the degree of leanness of the required air-fuel ratio will be described in detail using the flowchart shown in FIG. 7. Incidentally, this flowchart is the same as the flowchart shown in FIG. 4 except for the addition of steps S13B and 14B so in this example embodiment steps S13B and S14B in particular will be described in detail. After step S13A, the CPU determines whether the degree of leanness of the required air-fuel ratio read in step S13A has exceeded the lean boundary value (step S13B). If the determination is no, there is no need to perform a split injection so the CPU controls the fuel injection valve 21 to inject fuel (in a non-split injection) at the injection timing read in step S13A (step S14A).

Figure 8A:
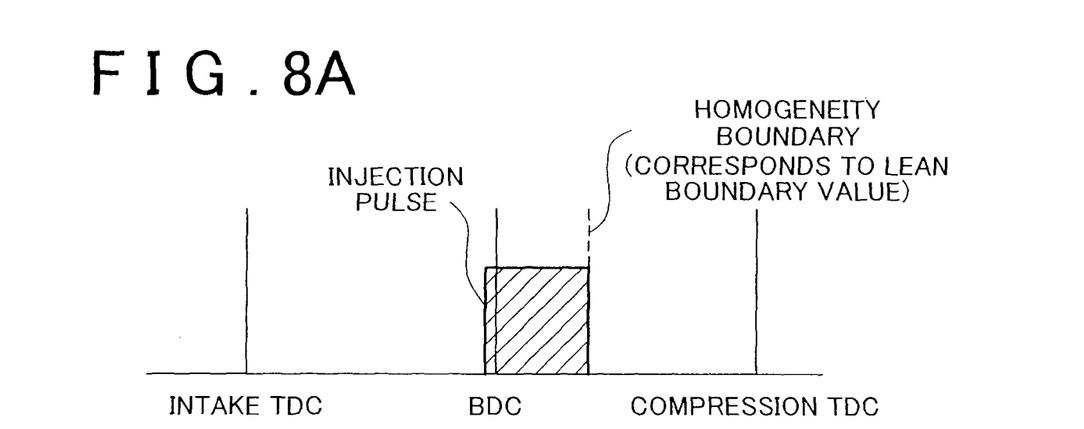
FIGS. 8A and 8B are views showing a frame format of a non-split fuel injection and a split fuel injection.
Figure 8B:
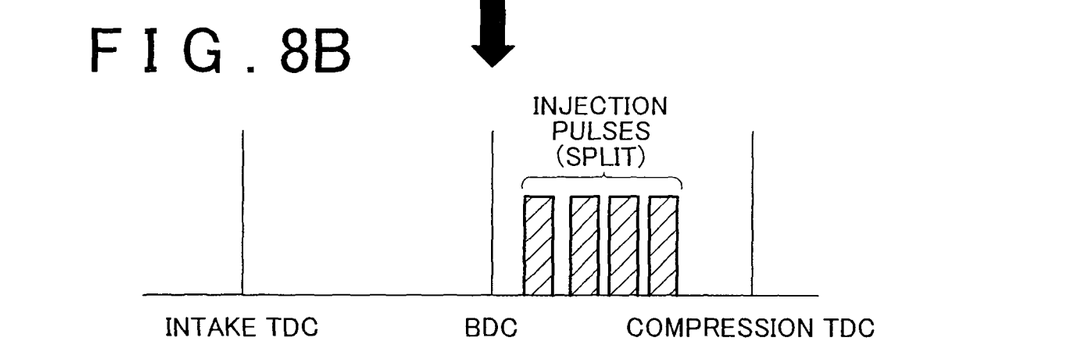

On the other hand, if the determination is yes, the CPU controls the fuel injection valve 21 to perform a split fuel injection at the injection timing read in step S13A (step S14B). FIGS. 8A and 8B are views showing a frame format of a non-split fuel injection (FIG. 8A) and a split fuel injection (FIG. 8B). In this step, the entire quantity of fuel that would normally be injected in a non-split injection on the intake stroke side near BDC of the intake stroke, as shown in FIG. 8A, is split into smaller parts in a split injection, as shown in FIG. 8B, by retarding the injection timing according to the degree of leanness of the required air-fuel ratio that has exceeded the lean boundary value. As a result, air is sandwiched between the injected fuel which promotes vaporization of the fuel and improves the homogeneity of the air-fuel mixture. As a result, even if fuel is injected at a timing that is retarded to a degree suitable for the degree of leanness of the required air-fuel ratio that exceeds the lean boundary value, the homogeneity of the air-fuel mixture can be inhibited from deteriorating. Therefore, a decline in energy efficiency can be suppressed, and as a result, good combustion can be achieved. Accordingly, it is possible to realize an ECU 1 that can achieve good combustion by changing the fuel injection according to the degree of leanness of the required air-fuel ratio to strengthen the tumble flow T with the injected fuel.

Third Example Embodiment

In a third example embodiment of the invention, under the control of the ECU 1, the fuel injection valve 21 injects fuel near BDC of the intake stroke during homogeneous combustion at times other than when the engine speed Ne is higher than a predetermined speed $\alpha$ in a high load operating range. The fuel that is injected adequately strengthens the tumble flow T, and this strengthened tumble flow T is maintained until the ignition timing. As a result, the swirl of the air-fuel mixture is maintained until the ignition timing so the combustion rate adequately improves, thereby enabling good homogeneous combustion to be achieved.

The fuel injection valve control program of the ECU 1 according to the third example embodiment of the invention includes an injection quantity control program for controlling the fuel injection quantity, an injection pressure control program for controlling the fuel injection pressure, and an injection timing control program for controlling the fuel injection timing. In this example embodiment, the fuel injection timing control program includes an injection timing specifying control program which, when the engine speed Ne is higher than the predetermined speed $\alpha$ in a high load operating range, performs a first fuel injection during a period when the most air enters the cylinder and performs a second fuel injection near BDC of the intake stroke. In addition, the injection quantity control program includes an injection quantity specifying control program for controlling the fuel injection quantity so that the crank angle range that corresponds to the fuel injection period of the second fuel injection becomes substantially constant with respect to the change in the operating state of the internal combustion engine 50. Aside from these points, the ECU 1 in the second example embodiment of the invention is the same as the ECU 1 in the first example embodiment of the invention. Also, the structure of the internal combustion engine system 100 to which the ECU 1 of the third example embodiment is applied is the same as that shown in FIG. 1.

The injection timing of the first fuel injection is set to the period when the engine speed Ne is a predetermined speed $\alpha$ and the most air enters the cylinder. Moreover, this injection timing is set so that the period of time from the end of the first fuel injection until the intake valve 55 starts to close becomes substantially constant with respect to the change in the engine speed Ne. Therefore, the injection timing is advanced as the engine speed Ne increases, and the first fuel injection starts during the period when the most air enters the cylinder. As a result, the output of the internal combustion engine 50 can be improved by the latent heat of vaporization effect. Also, the injection timing of the first fuel injection is set to the middle of the intake stroke when the throttle is wide open (i.e., at WOT: Wide Open Throttle). The setting of the injection timing is not limited to this, however. For example, a map or the like may be provided that shows the relationship between the engine speed Ne and the injection timing of the first fuel injection, and the injection timing may be set such that the first fuel injection starts during the period when the most air enters the cylinder based on the detected engine speed Ne and that map.

In contrast, the injection timing of the second fuel injection is set near BDC of the intake stroke, and furthermore, so that the fuel injection ends at BDC of the intake stroke. Also, with the second fuel injection, the fuel injection quantity is set so that the crank angle range that corresponds to the fuel injection period becomes substantially constant with respect to the change in the operating state of the internal combustion engine 50. As a result, the minimum fuel injection necessary to improve the homogeneity of the air-fuel mixture can be performed regardless of the engine speed Ne near BDC of the intake stroke. Incidentally, in the second fuel injection, an injection quantity appropriate for a predetermined crank angle range is ensured in this way. In the first fuel injection, on the other hand, the injection quantity is adjusted to the fuel quantity necessary to achieve an appropriate air-fuel ratio according to the injection quantity of the second fuel injection. In this example embodiment, various detecting means, determining means, and controlling means and the like are realized by the CPU, the ROM, and the RAM, and the internal combustion engine control program. In particular, injection timing changing means is realized by the CPU and the like together with the injection timing specifying control program, and injection quantity controlling means is realized by the CPU and the like together with the injection quantity specifying control program.

Figure 9:
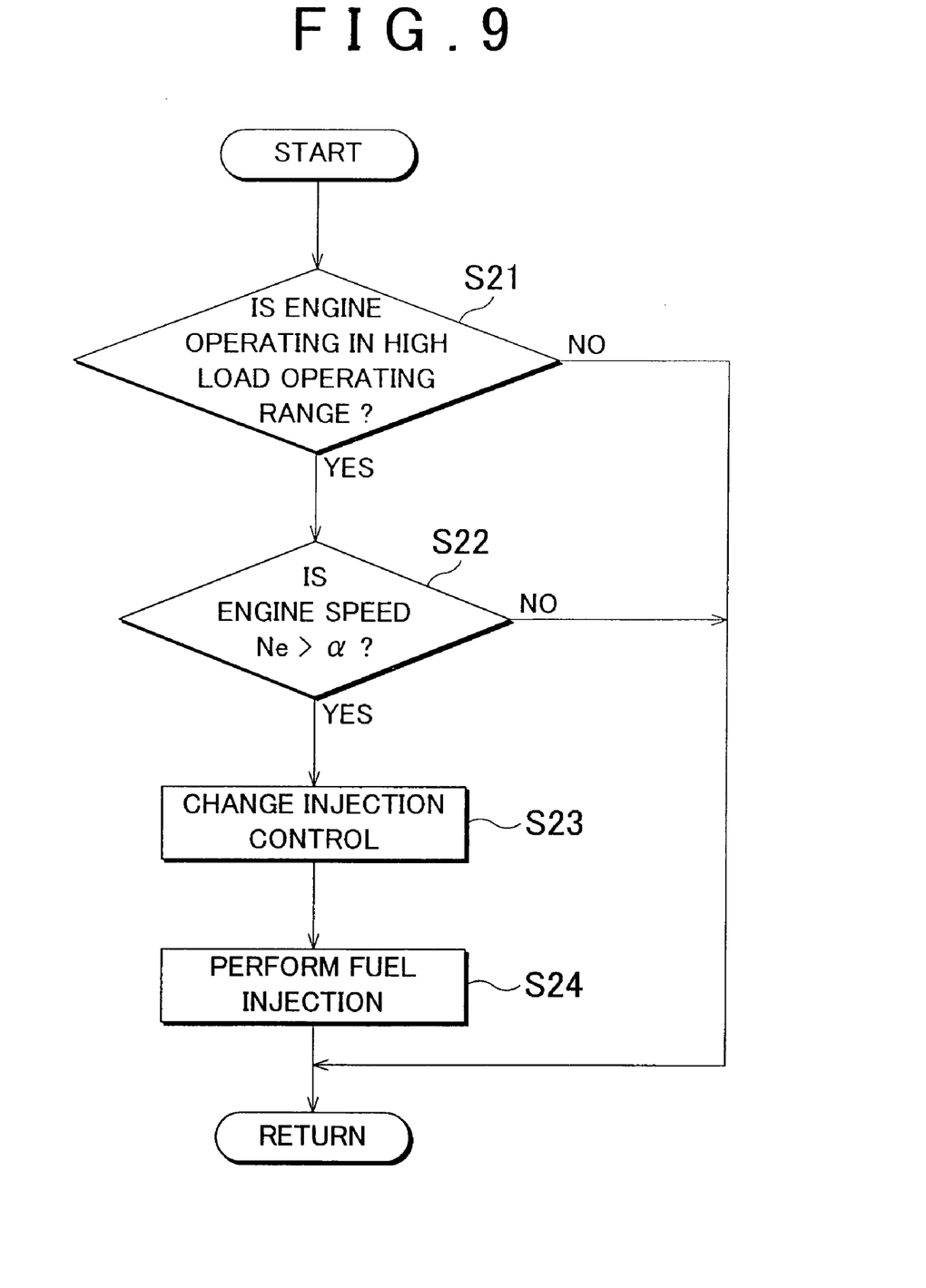
FIG. 9 is a flowchart of a routine executed by an ECU according to a third example embodiment of the invention.

Next, a routine executed by the ECU 1 of this example embodiment to control the fuel injection in order to achieve both the latent heat of vaporization effect and homogeneity of the air-fuel mixture in a high load operating range will be described in detail using the flowchart shown in FIG. 9. The ECU 1 controls the internal combustion engine 50 by having the CPU repeatedly execute the steps shown in the flowchart based on various programs such as the fuel injection valve control program and the internal combustion engine control program described above, which are stored in the ROM. The CPU first determines whether the internal combustion engine 50 is operating in a high load operating range (step S21). In this example embodiment, the CPU determines the operating state of the internal combustion engine 50 based on the engine speed Ne which is detected based on the output signal from the crank angle sensor 71, the load factor KL which is detected based on the output signal from the accelerator sensor 73, and an operating range map which is defined by the engine speed Ne and the load factor KL.

Figure 10:
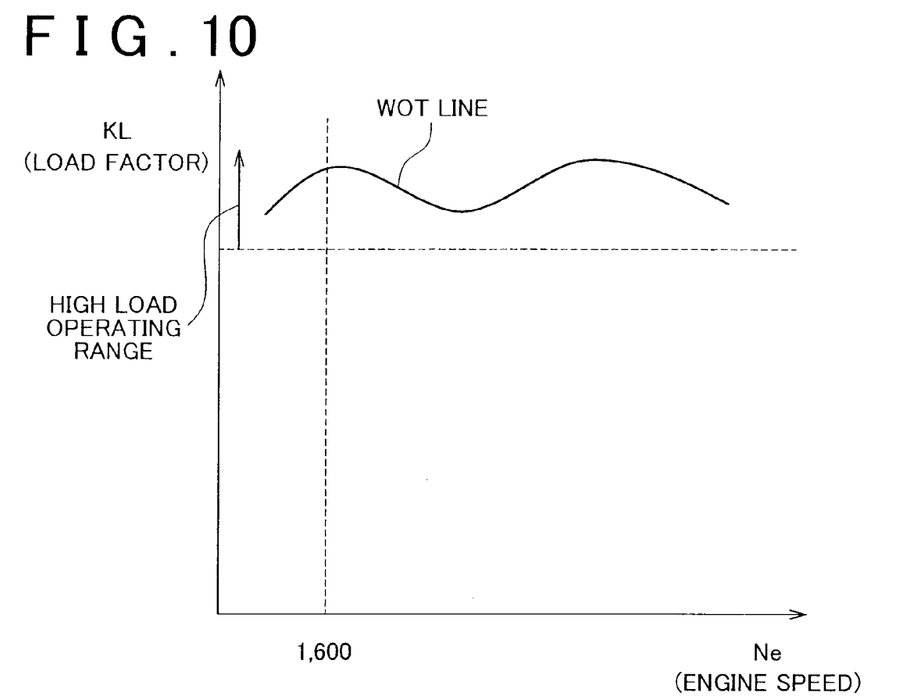
FIG. 10 is a view showing a frame format of an operating range map.

FIG. 10 is a view showing a frame format of an operating range map. On the map in this example embodiment, the operating range is divided into a high load operating range and a range other than this high load operating range according to the engine speed Ne and the load factor KL. However, the invention is not limited to this. For example, the operating range may be divided into more ranges. Incidentally, the operating range is not limited to being set according to the engine speed Ne and the load factor KL. For example, it may also be set according to a suitable operating state of the internal combustion engine 50.

Figure 11A:
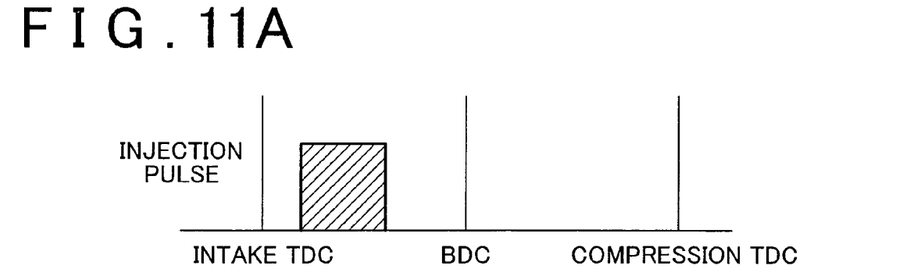
FIGS. 11A and 11B are views showing a frame format of a fuel injection in which injection control has not been changed and a fuel injection in which injection control has been changed.
Figure 11B:
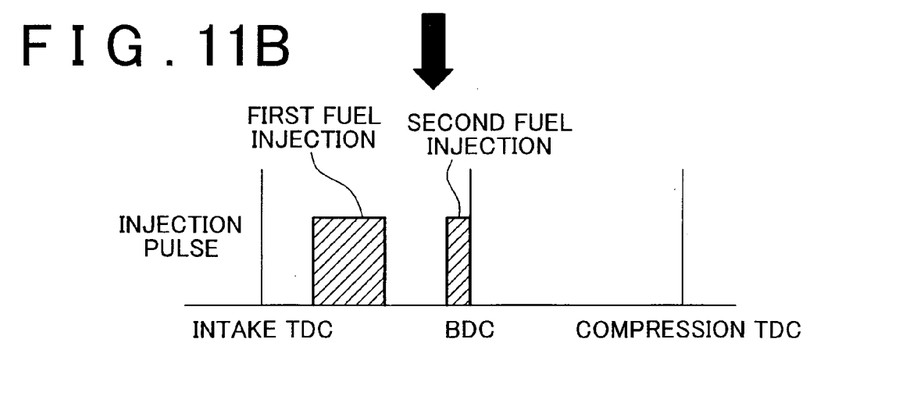

If the determination in step S21 is no, then the process returns to step S21 without any particular steps being taken. On the other hand, if the determination in step S21 is yes, the CPU determines whether the engine speed Ne is higher than a predetermined speed α (step S22). The predetermined speed α is set at 1,600 rpm, for example. If the determination in step S22 is no, then the process returns to step S21 without any particular steps being taken. On the other hand, if the determination in step S22 is yes, the CPU changes the injection control to perform a split injection in which the fuel injection is split into a first fuel injection and a second fuel injection (step S23). FIGS. 11A and 11B are views showing a frame format of a fuel injection in which injection control has not been changed and a fuel injection in which injection control has been changed in a high load, high speed operating range. As shown in FIG. 11A, when the injection control is not changed, the injection timing is closer to TDC of the intake stroke than BDC of the intake stroke compared to the injection timing shown in FIG. 6A. In this case, although the output of the internal combustion engine 50 can be improved by the latent heat of vaporization effect, the tumble flow T is unable to be adequately strengthened by the fuel injection. In contrast, when the injection control is changed in this step, the first fuel injection is performed in the middle of the intake stroke and the second fuel injection is performed close to BDC of the intake stroke, as shown in FIG. 11B.

Therefore, it is possible to achieve both the latent heat of vaporization effect and homogeneity of the air-fuel mixture by the CPU executing a step to control the fuel injection valve 21 to perform the first fuel injection and the second fuel injection according to these injection timings (step S24). Incidentally, in the example embodiment, the second fuel injection is performed to improve the homogeneity of the air-fuel mixture. However, the invention is not limited to this. For example, the second fuel injection may also be performed to improve the combustion rate. More specifically, the combustion rate may be improved by making the injection timing of the second injection longer than it is in the third example embodiment as a countermeasure against knocking when the engine speed Ne is relatively low even in the high load operating range. However, in this case, the fuel injection quantity of the first fuel injection is reduced while the fuel injection quantity of the second fuel injection is increased compared with the third example embodiment so the latent heat of vaporization effect would be less than it is in the third example embodiment (i.e., when it is achieved together with homogeneity of the air-fuel mixture). Accordingly, it is possible to realize an ECU 1 that can both achieve the latent heat of vaporization effect and homogeneity of the air-fuel mixture or an improved combustion rate in a high load operating range by splitting the fuel injection to strengthen the tumble flow T with the injected fuel.

The invention is not limited to the foregoing first to third example embodiments, but may be embodied with various changes, modifications or improvements without departing from the spirit and scope of the invention.

The invention claimed is:

1. A control apparatus of an in-cylinder injection type spark ignition internal combustion engine that generates a tumble flow inside a cylinder and strengthens the tumble flow by fuel injected near bottom dead center of an intake stroke, comprising:

an injection timing changing device that changes an injection timing of the fuel based on an amount of air drawn into the cylinder, wherein when the in-cylinder injection type spark ignition internal combustion engine is operating in a high load operating range and the engine speed of the in-cylinder injection type spark ignition internal combustion engine is higher than a predetermined speed, the injection timing changing device performs a first fuel injection during the middle of the intake stroke when the throttle is wide open and performs a second fuel injection near bottom dead center of the intake stroke.

2. The control apparatus according to claim 1, wherein the injection timing changing device increases the retardation of the injection timing of the fuel when the required air-fuel ratio of the in-cylinder injection type spark ignition internal combustion engine becomes leaner.

3. The control apparatus according to claim 2, further comprising:

a split injecting device that injects the fuel in parts when the degree of leanness of the required air-fuel ratio of the in-cylinder injection type spark ignition internal combustion engine exceeds a predetermined value.

4. The control apparatus according to claim 1, wherein the injection timing changing device advances the first fuel injection more the higher the engine speed becomes.

5. The control apparatus according to claim 1, further comprising:

an injection quantity controlling device that controls an injection quantity of the fuel so that a crank angle range that corresponds to the fuel injection period of the second fuel injection becomes substantially constant with respect to a change in an operating state of the in-cylinder injection type spark ignition internal combustion engine.

6. The control apparatus according to claim 1, wherein the injection timing changing device performs the first fuel injection in the middle of the intake stroke of the in-cylinder injection type spark ignition internal combustion engine.

7. A control method of an in-cylinder injection type spark ignition internal combustion engine that generates a tumble flow inside a cylinder and strengthens the tumble flow by fuel injected near bottom dead center of an intake stroke, comprising:

changing an injection timing of the fuel based on an amount of air drawn into the cylinder, wherein when the in-cylinder injection type spark ignition internal combustion engine is operating in a high load operating range and the engine speed of the in-cylinder injection type spark ignition internal combustion engine is higher than a predetermined speed, the injection timing is such that a first fuel injection is performed during the middle of the intake stroke when the throttle is wide open and a second fuel injection is performed near bottom dead center of the intake stroke.

8. The control method according to claim 7, wherein the injection timing of the fuel is retarded more the leaner a required air-fuel ratio of the in-cylinder injection type spark ignition internal combustion engine becomes.

* * * * *